Feb. 28, 1967 F. VOOS ETAL 3,306,186
APPARATUS FOR MARKING ROLLED STOCK
Filed Oct. 22, 1965 6 Sheets-Sheet 1

INVENTORS
FRANZ VOOS &
FRANZ MOLITOR
By
Lowry & Rinehart
ATTYS.

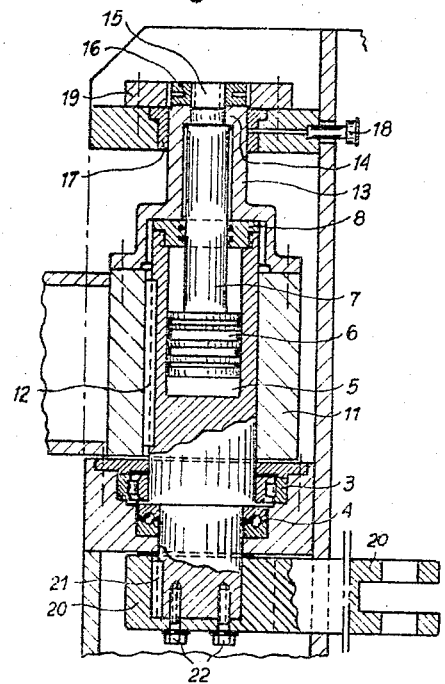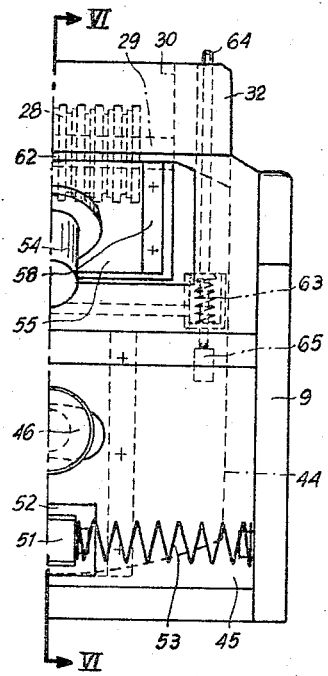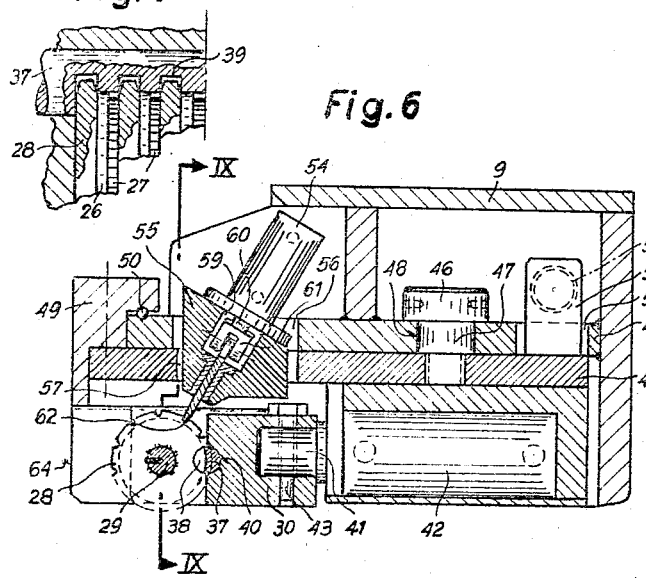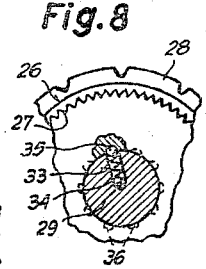

INVENTORS

FRANZ VOOS &
FRANZ MOLITOR
BY
Lowry & Rinehart

ATTYS.

Feb. 28, 1967 F. VOOS ETAL 3,306,186
APPARATUS FOR MARKING ROLLED STOCK
Filed Oct. 22, 1965 6 Sheets-Sheet 4
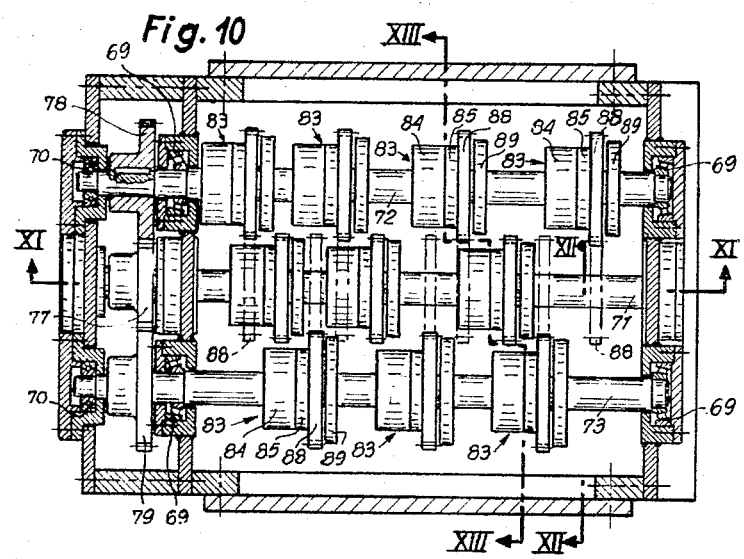
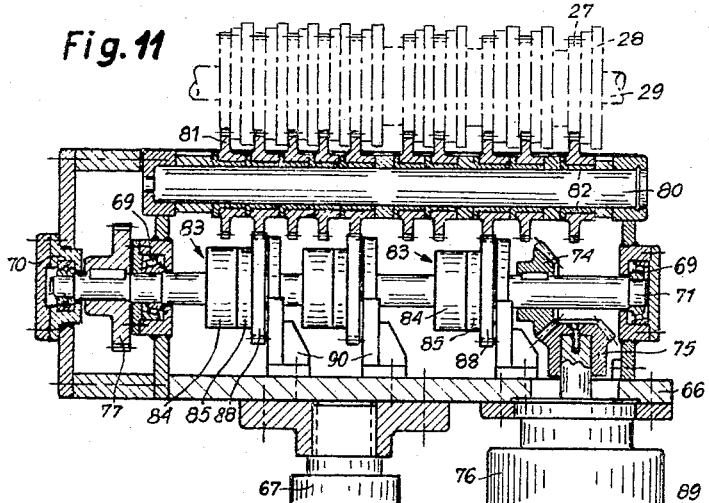
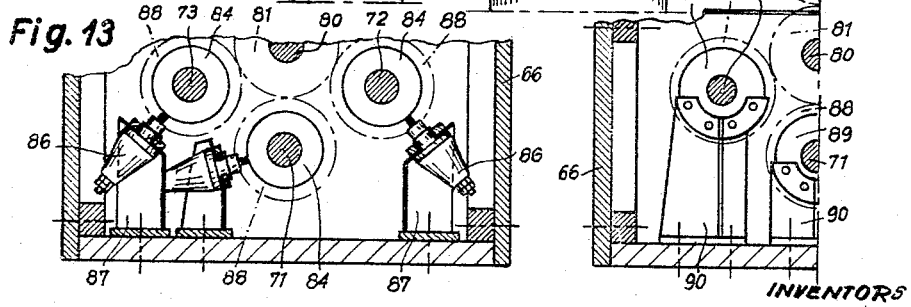
INVENTORS
FRANZ VOOS &
FRANZ MOLITOR
BY
Lowry & Rinehart
ATTYS.

INVENTORS
FRANZ VOOS &
FRANZ MOLITOR
BY
Lowry & Rinehart
ATTYS.

3,306,186
APPARATUS FOR MARKING ROLLED STOCK
Franz Voos, Solingen, and Franz Molitor, Langenfeld, Germany, assignors to Stommel & Voos Stahlstempelfabrik, Solingen, Germany, a firm
Filed Oct. 22, 1965, Ser. No. 500,836
5 Claims. (Cl. 101—18)

This invention relates to apparatus for marking rolled stock such as blooms, billets or sheet bars still at rolling temperature of the type comprising marking means adapted to be moved into the travel of stock for automatically marking the rolled stock to be marked and moving off therefrom upon completion of such marking operation.

Apparatus of this kind are known which use single stamps or stamp or marking discs, respectively. In the first alternative, the actually required types have to be manually inserted in the marking head and in the second alternative, the marking discs have to be set by hand. Another disadvantage of these known apparatus is that they are located in the travel of stock so that upon completion of the stamping or marking operation they have to be moved out of the travel of stock by raising them and subsequently, i.e., after the rolled stock has passed, lowering them again into the travel of stock for the following marking operation. Due to this inconvenience and to the necessity of having to insert by hand the required types in the single stamps or set by hand the stamp or marking discs, it is impossible to mark by the known apparatus rolled stock which is passing in rapid succession.

To avoid these disadvantages the present invention provides an apparatus for marking rolled stock such as blooms, billets or sheet bars which comprises a column, an arm pivoted at one of its ends to said column, a marking head mounted at the free end of said arm so as to be pivotable into the travel of stock, a plurality of type carrying adjustable marking discs provided with toothed rims and incorporated in said marking head, and an electrical selecting device for adjusting said marking discs, said selecting device consisting of a gearing which under the control of magnetic gear couplings can be engaged with, and disengaged from, said toothed rims on said marking discs.

According to another feature of the invention, the marking head incorporates a carriage which has forked ends and is displaceable on guide tracks within said marking head by means of an electrically controlled hydraulic cylinder, and the marking discs are seated on a common axle guided in said forked ends of the carriage.

Whereas in the hitherto known marking apparatus of the contemplated kind the types carried by the marking discs have been impressed on the rolled stock owing to the kinetic energy of the moving rolled stock, now the stamping or marking of the rolled stock is effected by the hydraulic feed of the carriage carrying the marking discs which immediately after the marking operation returns with the marking discs into its initial or inoperative position. Thus a uniformly deep stamping is ensured, avoiding at the same time that the impression becomes blurred. Furthermore, also the shocks are avoided which have been hitherto caused by the kinetic energy of the rolled stock and which would heavily stress the means provided for pivoting the marking head. While it is already known to move the marking device off the marked surface at the end of the stamping operation, thereby to avoid blurring of the stamp impression and the impacts impinging on the device during the stamping operation, and that by means of a stop which in its inoperative position is located by the action of a spring in front of the stamp face and which is forced back by the kinetic energy of the rolled stock thereby to charge a hydraulic energy accumulator which returns the stop with the marked stock into its initial position. However, a basic requirement for a reliable operation of this marking apparatus is that the rolled stock has a sufficient kinetic energy, which is available only in large cross section rolled stock. Moreover, such apparatus involve the risk of premature fatigue of the spring cooperating with the stop, which is particularly due to the fact that this spring is constantly subjected to the rolling heat.

A further feature of the invention consists in that the marking head includes a mounting plate supported for horizontal pivotal movement against the lateral pressure of helical compression springs and the carriage and the guide tracks as well as the hydraulic cylinder mounted on the carriage are secured to the underside of the mounting plate, two spaced parallel rod-shaped feelers being arranged in the guide tracks so as to project from the end face of the marking head, the feelers when brought into contact with a surface to be marked being adapted to adjust the marking discs through the intermediary of the mounting plate so as to be positioned parallel to the surface to be marked.

Due to the pivotal mounting of the carriage carrying the marking discs, this carriage together with the marking discs will be reliably adjusted parallel to the surface to be marked of the rolled stock, so that even if the latter is more or less inclined in relation to the marking discs a uniform impression of the types of all selected marking discs on the surface to be marked is ensured.

In accordance with another feature of the invention, it is expedient to provide a locking means for locking the type carrying marking discs in their adjusted position relative to a surface to be marked until the marking discs are fed toward the surface to be marked and to associate a hydraulic cylinder with the locking means for engaging the locking means in respective interspaces between any two adjacent types on the type carrying marking discs, thereby to lock the marking discs in the adjusted position.

This locking means reliably prevents the adjusted marking discs from being unintentionally disarranged, particularly when the marking head is pivoted into the travel of stock.

A further advantageous feature of the invention consists is that the arm carrying the marking head is pivoted to the column through the intermediary of a shaft, the arm being mounted on the shaft so as to be secured against rotation relative to the shaft while being axially displaceable thereon, an electrically controlled hydraulic cylinder being provided for driving the shaft and another hydraulic cylinder being provided for axially displacing the arm on the shaft.

Due to the axial displaceability of the pivotable arm, the marking head can be adjusted to the height corresponding to the respective thickness of the rolled stock to be marked.

Further objects and features of the present invention will be apparent from the following detailed description of an exemplified embodiment of an apparatus for marking rolled stock, having reference to the accompanying drawings, in which:

FIG. 4 is a section taken on line IV—IV of FIG. 2;

FIG. 5 is a top plan view of a longitudinal half of the upwardly open marking head;

FIG. 6 is a section taken on line VI—VI of FIG. 5;

FIG. 7 is a partial sectional view of the marking head;

FIG. 8 is a fragmentary view of a marking disc, showing means for setting the marking disc after adjustment thereof;

FIG. 10 is a top plan view, partly in section, of the adjusting device for the marking discs;

FIG. 11 is a section taken on line XI—XI of FIG. 10;

FIG. 12 is a section taken on line XII—XII of FIG. 10;

FIG. 13 is a section taken on line XIII—XIII of FIG. 10;

Figure 1:
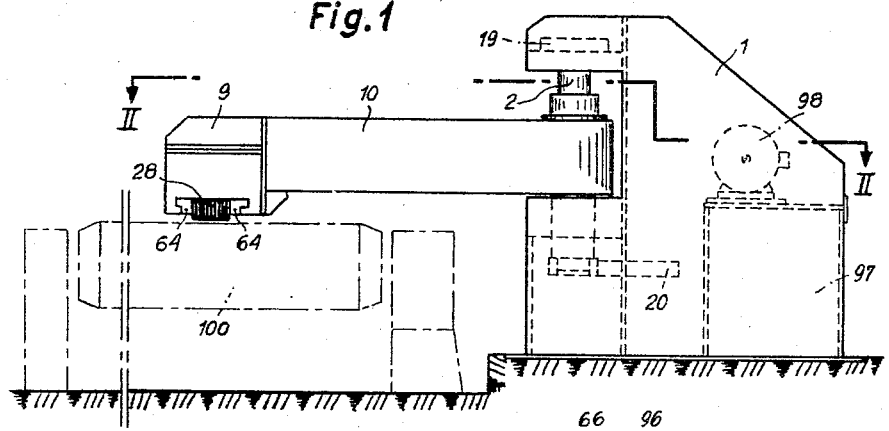
FIG. 1 is a side elevational view of a marking apparatus embodying the invention, showing the marking head in its operative position.
Figure 2:
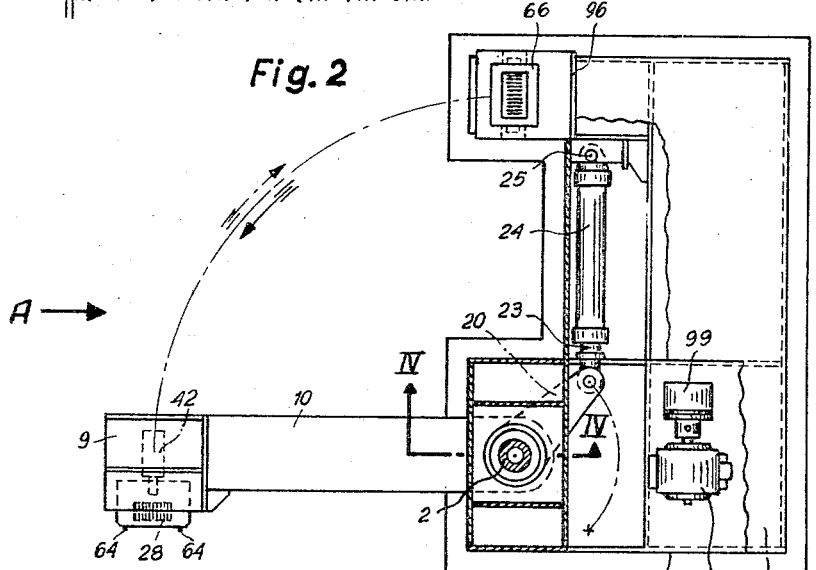
FIG. 2 is a section taken on line II—II of FIG. 1.

Referring to the drawings, and aparatus for marking rolled stock according to the invention comprises a column 1 mounting a vertical shaft 2 which is supported for rotation in a roller bearing 3 and in a thrust bearing 4 (FIG. 4). The upper portion of the shaft 2 is provided with an axial blind bore forming a hydraulic cylinder 5 accommodating a piston 6 which is integral with a piston rod 7 passing through a cover 8 of the hydraulic cylinder 5. The marking apparatus has a marking head 9 arranged at one end of an arm 10 which is mounted at its other end on the shaft 2 through the intermediary of a bushing 11 (FIG. 4) and secured against rotation by a key 12. The arm 10 is secured to the lower end of a tubular supporting member 13 which encloses that part of the piston rod 7 which projects from the hydraulic cylinder 5. The projecting part of the piston rod 7 has a threaded end portion 15 of reduced diameter which penetrates an end wall 14 of the tubular supporting member 13 and on which a threaded ring 16 is screwed against the end wall 14 of the supporting member 13, thereby to secure the piston rod 7 to the latter. The tubular supporting member 13 is slidably mounted in a flanged bushing 17 which is supplied with lubricating grease through a grease nipple 18. The bushing 17 is secured in place by means of a retaining washer 19. A lever arm 20 which is pushed by one of its ends onto the lower end of the shaft 2 is positively connected with the latter by means of a key 21 and secured in place by screws 22. The opposite end of the lever arm 20 is designed as a forked end and flexibly linked to a piston rod 23 of a hydraulic piston and cylinder unit 24 which is fulcrumed at 25 to the column 1 (FIG. 2).

Figure 9:
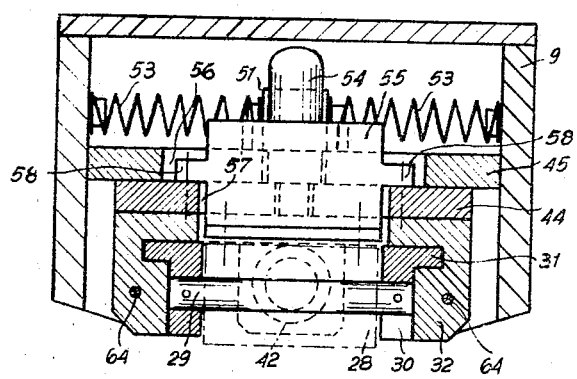
FIG. 9 is a section taken on line IX—IX of FIG. 6.
Figure 14:
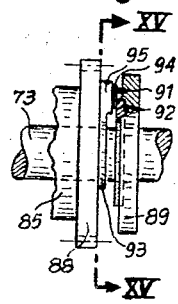
FIG. 14 is a fragmentary view of a detail of FIG. 10.
Figure 15:
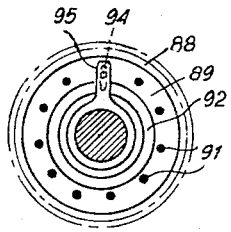
FIG. 15 is a section taken on line XV—XV of FIG. 14.

The marking head 9 includes a plurality of marking discs 28 which are each provided with a collar 26 and a toothed rim 27 and seated with play on a common axle 29. The axle 29 is guided in the forked ends of a carriage 30 arranged to slide with laterally extending arms 31 on guide tracks 32. The axle 29 is provided on its circumference with a plurality of bore holes 33 which correspond in number to the number of the marking discs 28 and accommodate balls 35 engaged under the action of helical compression springs 34 in countersunk bores 36 in the wall of the central bore of each marking disc 28 to secure same in the respectively adjusted position (FIG. 8). A bolt 37 is guided parallel to the axle 29 of the marking discs 28 in the forked ends of the carriage 30 and is provided with a peripheric recess 38 extending over the length of the marking discs 28. Within the recess 38 the marking discs 28 are guided with the apex of their collars 26 on the bolt 37 in such a manner that in the case of impacts on the marking discs 28 which may occur during the marking operation the bolt 37 serves as a countersupport for the marking discs 28, i.e. it will absorb impacts on the marking discs 28 thereby to relieve the axle 29 of the marking discs 28 from bending load. Within the recess 38 of the bolt 37 the marking discs 28 are also guided in grooves 39 in which they keep with their types at a distance away from the bolt 37 which is sufficient to prevent the types from contacting the bolt 37 when a blow is applied to the marking discs 28. The bolt 37 is located with one longitudinal half in a corresponding recess 40 of the carriage 30 which with its end remote from the bolt 37 is pushed on the free end of a piston rod 41 of a hydraulic cylinder 42 and secured in place by means of a screw 43 extending through the carriage 30 and the piston rod 41. The marking head 9 comprises in its interior a horizontal partition 45 to the underside of which a horizontal mounting plate 44 is pivoted by means of a screw 46. The screw 46 has a threaded end portion screwed into the mounting plate 44 and a plain shank 47 guided in a corresponding aperture 48 in the partition 45. The hydraulic cylinder 42 and the guide tracks 32 for the carriage 30 are fixed to the underside of the mounting plate 44. The carriage 30 is arranged to slide on the partition 45 through the intermediary of a bracket 49 and balls 50. The mounting plate 44 has an arm 51 which extends through an aperture 52 in the partition 45. Helical springs 53 are provided on either side of the arm 51 and bear with one of their ends against the arm 51 and with their other end against the inner wall of the marking head 9. A hydraulic cylinder 54 is fixed to a support 55 which extends through an aperture 56 in the partition 45 and through an aperture 57 in the mounting plate 44. The support 55 bears with lateral lugs 58 (FIG. 9) on the mounting plate 44 to which it is bolted. The support 55 is, moreover, provided with a recess 59 into which a piston rod 60 of the hydraulic cylinder 54 projects with a fork head 61 fixed thereto (FIG. 6). A strip-like locking arm 62 is at one of its ends secured in the fork head 61 and extends through the support 55 from which projects its other end which engages in the respective interspaces between any two adjacent types on the circumference of the marking discs 28, thereby to secure all marking discs 28 in the respectively adjusted position. The marking head 9 is, furthermore, provided with two spaced parallel rod-shaped feelers 64 loaded at one end by two precompressed helical compression springs 63 and projecting with their other end from the end face of the marking head 9. The feelers 64 are arranged to cooperate with electrical limit switches 65 and when brought into contact with a surface to be marked are adapted to adjust the carriage 30 with the marking discs 28 through the intermediary of the pivotable mounting plate 44 so as to be positioned parallel to the surface to be marked of the rolled stock, thereby to ensure a uniformly deep impression of the types of the marking discs 28 on the rolled stock.

Figure 3:
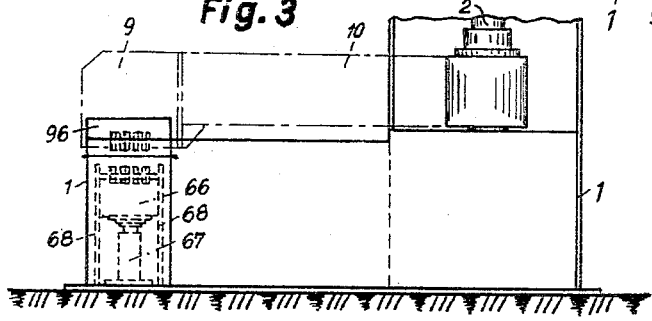
FIG. 3 is a front elevational view of the marking apparatus seen in the direction indicated by arrow A in FIG. 2.

In FIGS. 10 to 15 a selecting device for positioning the marking discs 28 is illustrated which comprises a casing 66 mounted on the column 1 so as to be vertically displaceable on slide bars 68 through the intermediary of a hydraulic cylinder 67. The casing 66 accommodates three parallel shafts 71, 72 and 73 mounted in roller bearings 69 and ball bearings 70, the shaft 71 being disposed below and in staggered relationship to the shafts 72 and 73 which are arranged in spaced relationship in the same horizontal plane (FIG. 13). A geared motor 76 flanged to the casing 66 is provided to drive the shaft 71 through the intermediary of two bevel gears 74 and 75. The rotation of the shaft 71 can be transmitted to the shafts 72 and 73 by gears 77, 78 and 79. On an axle 80 supported in the casing 66 a plurality of gears 81 equal in number to the marking discs 28 are mounted by means of interpositioned flanged bushings 82, for cooperation with the toothed rims 27 of the marking discs 28. Each gear 81 has an associated magnetic gear coupling 83 comprising a driving part 84 and a driven part 85. The couplings 83 are distributed on the shafts 71, 72 and 73. The driving parts 84 of the magnetic gear couplings can be supplied with current through sliding contacts 86 mounted on blocks 87. The driven parts 85 of the magnetic gear couplings 83 are each provided with a gear 88 which is flanged thereto and in mesh with the corresponding gear 81 on the axle 80. The gears 88 have each an associated contact disc 89 which is fixed to a respective block 90 screwed to the bottom of the casing 66. The contact discs 89 are provided with central bores through which the shafts 71, 72 and 73 extend with clearance. A plurality of circularly disposed contacts 91 equal in number to the types on the marking discs 28, and a vacant terminal L, are provided on the sides of the contact discs 89 facing the gears 88. The contact discs 89, moreover, are each provided with a slip ring 92. To each gear 88 there is fixed a tracer 95 terminating in an annular boss 93 and provided with a carbon brush 94 with which it sweeps over the adjacent slip ring 92, the contacts 91 and the vacant terminal L of the contact discs 89. At the upper end of the column 1 a stop 96 is arranged for the marking head 9 to abut thereagainst when being swung toward the selecting device (FIGS. 2 and 3). The hydraulic cylinders 5, 24, 42, 54 and 67 are supplied with oil from a reservoir 97 by a pump 99 driven by an electric motor 98. Reference numeral 100 designates the roller table of a rolling mill train on which the rolled stock is fed to the marking apparatus.

Figure 16:
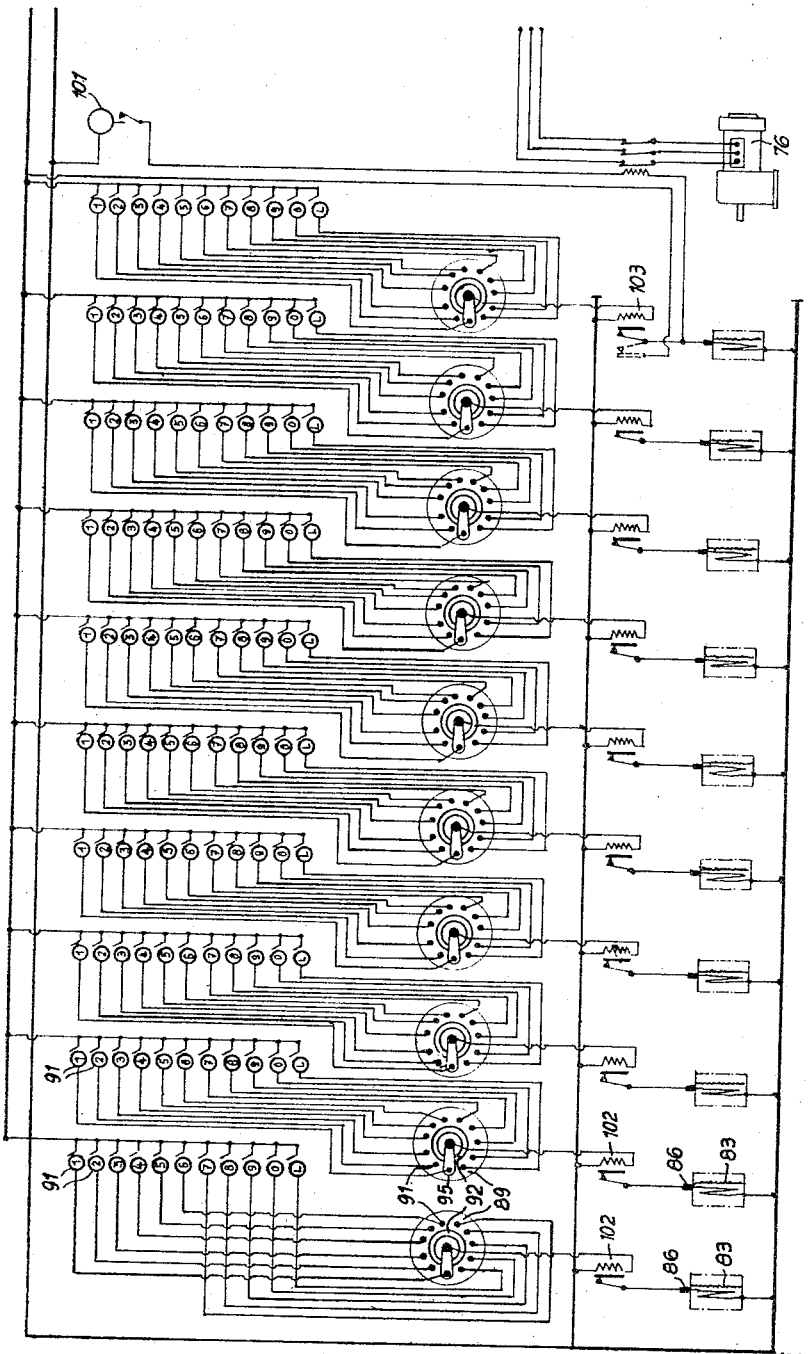
FIG. 16 is the electric circuit diagram of the adjusting device.

Referring to FIG. 16, a switch 101 is shown to be provided for the geared motor 76 driving the shafts 71, 72 and 73. Reference numerals 102 and 103 respectively designate relays controlling the magnetic gear couplings 83 arranged on the shafts 71, 72 and 73 and a relay controlling the geared motor 76.

Figure 17:
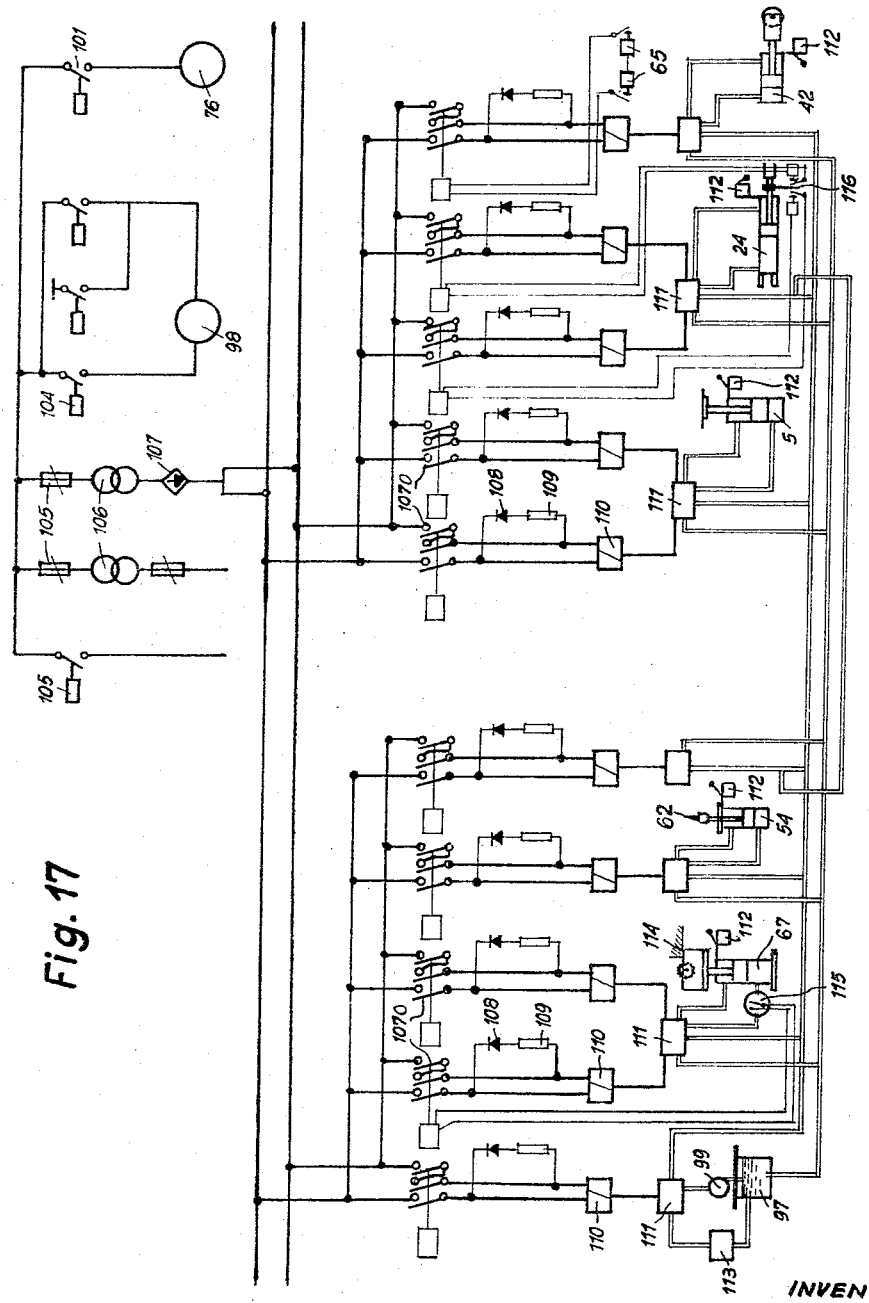
FIG. 17 is the circuit diagram of the marking apparatus.

In the circuit diagram of FIG. 17 a switch for the electric motor 98 driving the pump 99 is referenced 104 and to be operated together with the switch 101 for the geared motor 76 of the selecting device. Rheostats 105, a transformer 106 and a rectifier 107 form a unit for the D.C. supply of the magnetic gear couplings 83. Relays 107, rectifiers 108, resistances 109, magnets 110, magnetic valves 111 and limit switches 112 are provided for the directional control of the oil for the hydraulic cylinders 5, 24, 42, 54 and 67. A magnetic valve 113 is connected ahead of the magnetic valve 111 for the pump 99. When the hydraulic cylinders 5, 24, 42, 54 and 67 are inoperative this valve 113 serves to return the oil continually delivered by the pump 99, into the oil reservoir 97 before it enters the conduits to the hydraulic cylinders. A stop 114 (FIG. 17) is arranged on the marking head 9 and serves to limit the stroke of the hydraulic cylinder 67 which is adapted to cooperate with a contact manometer 115. Two limit switches 116 are provided for controlling the arm 10 supporting the marking head 9.

The described apparatus operates as follows:

The apparatus is preferably push button operated from a control desk, not shown. First the marking head 9 is adjusted to the height corresponding to the thickness of the rolled stock to be marked, by means of the hydraulic cylinder 5. Then the electric motor 98 driving the pump 99, as well as the D.-C. unit consisting of the rheostats 105, the transformer 106 and the rectifier 107 are set in operation through the switch 104 by pressing a single push button. Subsequently the adjustment of the marking discs 28 with respect to the desired types, which comprise the numerals 1 to 0, is initiated. To this end, the push buttons corresponding to the desired types of the marking discs 28 are pressed, whereupon a further push button is operated to set in operation the hydraulic cylinder 67. In order to engage the gears 81 seated on the axle 80 with the toothed rims 27 of the marking discs 28, the casing 66 of the selecting device is raised by means of the hydraulic cylinder 67 until it contacts the stop 114 (FIG. 17) arranged on the marking head 9, whereupon a predetermined pressure set in the contact manometer 115 builds up in the hydraulic cylinder 67, which pressure ensures a perfect meshing engagement between the gears 81 of the selecting device and the toothed rims 27 of the marking discs 28. When the predetermined pressure has been attained the oil supply to the hydraulic cylinder 67 is shut off by the magnetic valve 113 which returns the oil into the reservoir 97. By pressing a further push button the electric motor 76 driving the shafts 71, 72 and 73 is started through its associated switching relay and thus the gearing of the selecting device is set in operation. Assuming that the operated push buttons are related to types on the first three marking discs 28, these latter will rotate, together with the gears 88 in engagement therewith through the intermediary of the gears 81, until the tracers 95 on the gears 88 arrive at the contacts 91 provided on the associated contact discs 89 and energized by the push buttons, whereby the circuit to the magnetic gear couplings 83 driving the gears 88 is opened. The types on the first three marking discs 28 have thus been set and the latter are locked in the adjusted position by the spring-loaded balls 35 engaging the countersunk bores 36 distributed around the inner periphery of the marking discs 28. The remaining seven marking discs 28 go on rotating together with the respective gears 88 until the tracers 95 of the latter arrive at the vacant terminals L of the associated contact discs 89 and thereby likewise open the circuit feeding the appertaining magnetic gear couplings 83. In this position of the unemployed marking discs 28 these latter are facing the surface to be marked of the rolled stock with a typeless circumferential surface portion and thus remain inoperative during the marking operation. When the last of the unemployed marking discs 28 has come to a standstill the geared motor 76 of the selecting device is stopped at the same time through its associated switching relay and the hydraulic cylinder 67 is set in operation for disengaging the gearing of the selecting device from the toothed rims 27 of the marking discs 28. During its return stroke, the hydraulic cylinder 67 actuates its associated limit switch 112 through which the hydraulic cylinder 54 is set in operation. As a result, the strip-like locking arm 62 connected with the piston rod 60 of the cylinder 54 engages in the interspace between two adjacent types on the circumference of the marking discs, thereby to lock the marking discs 28 in the adjusted position. During its forward stroke, the hydraulic cylinder 67 actuates its associated limit switch 112 through which the hydraulic cylinder 24 is set in operation, by means of which the marking head 9 is swung into the travel of stock. Subsequently the marking head 9 contacts with its feelers 64 the surface to be marked of the stock and adjusts itself to extend parallel to this surface, whereupon the feelers 64 actuate their associated limit switches 65 through which the hydraulic cylinders 54 and 42 are set in operation. During the return stroke of the hydraulic cylinder 54 the locking arm 62 is disengaged from the interspaces between the types on the circumference of the marking discs 28, while the feed of the carriage 30 is effected by the hydraulic cylinder 42 controlled by the associated magnetic valve 111, whereby the set types of the first three marking discs 28 are impressed on the surface to be marked of the rolled stock. During the return stroke of the hydraulic cylinder 42 the marking discs 28 are removed from the marked surface, whereupon the arm 10 and thus the marking head 9 mounted thereon are returned into the initial position in which the marking head 9 abuts against the stop 96 on the column 1, by the hydraulic cylinder 24 controlled by the associated magnetic valve 111. The aforedescribed process is repeated by setting each time the desired types on the marking discs 28.

The invention may be embodied in other specific forms without departing from the spirit or essential characteris-

We claim:
1. An apparatus for marking rolled stock such as blooms, billets or sheet bars comprising a column;

an arm, said arm having one end attached to said column;

a marking head mounted at the other end of said arm, said marking head having a mounting plate, said mounting plate having thereon at least one guide track, said guide track having at least one feeler, said feeler being so arranged in said guide track as to project from the end face of said marking head, a carriage, and motivating means, said carriage being movable along said guide track by said motivating means;

axle means, said axle means being guided in said carriage; and at least one type carrying adjustable marking disc, said marking disc being seated on said axle means, said marking disc having a plurality of individual adjacent types, a toothed rim, and selecting means for adjusting said marking disc, said selecting means having a gearing, said gearing being engageable with said toothed rim, and a gear coupling, said gear coupling controlling the engagement and disengagement of said gearing and said toothed rim;

said feeler on said guide track when brought into contact with a surface to be marked being adapted to adjust said marking disc so said marking discs will be parallel to said surface.

2. An apparatus as claimed in claim 1, wherein said at least one feeler is axially displaceable in bores in said at least one guide track and loaded by respective helical compression springs accommodated in said bores, said feeler being arranged for cooperation with limit switches provided in said marking head, in such a manner that when coming into contact with a surface to be marked said feeler will be displaced against the action of said helical compression springs thereby to actuate said limit switches for setting in operation said motivating means to move said carriage along said guide track and thus move said marking disc which is mounted on said carriage by said axle means.

3. An apparatus as claimed in claim 1, wherein a locking means is provided for locking said at least one type carrying marking disc in its adjusted position relative to a surface to be marked until said marking disc is once more fed toward said surface to be marked, a motivating means being associated with said locking means for engaging said locking means in respective interspaces between any two adjacent types on said type carrying marking disc, thereby to lock said marking disc in said adjusted position.

4. An apparatus as claimed in claim 1, wherein said arm carrying said marking head is pivotally attached to said column by means of a shaft, said shaft being mounted on said column, said arm being mounted on said shaft so as to be secured against rotation relative to said shaft while being axially displaceable thereon, motivating means being provided for driving said shaft and another motivating means being provided for axially displacing said arm on said shaft.

5. An apparatus as claimed in claim 1, wherein said selecting device is housed in a casing and motivating means is provided for displacing said casing, thereby engaging and disengaging said selecting device with said toothed rim of said marking disc.

References Cited by the Examiner
UNITED STATES PATENTS

| | | | |
|---|---|---|---|
| 1,639,789 | 8/1927 | Walters. | |
| 3,112,688 | 12/1963 | Pannier | 101—4 |
| 3,120,175 | 2/1964 | Martin | 101—18 X |
| 3,207,066 | 9/1965 | Gartside | 101—4 |

ROBERT E. PULFREY, *Primary Examiner.*

W. F. McCARTHY, *Assistant Examiner.*